United States Patent
Quarrie (10) Patent No.: US 10,766,615 B1
(45) Date of Patent: Sep. 8, 2020

(54) HOVER AIRLIFT LOGISTICS OPERATIONS GUIDED EXPEDITIONARY AUTONOMOUS SCALABLE AND MODULAR VTOL PLATFORM

(71) Applicant: Lindsay O'Brien Quarrie, Socorro, NM (US)

(72) Inventor: Lindsay O'Brien Quarrie, Socorro, NM (US)

( * ) Notice: Subject to any disclaimer, the term of this patent is extended or adjusted under 35 U.S.C. 154(b) by 332 days.

(21) Appl. No.: 15/886,606

(22) Filed: Feb. 1, 2018

Related U.S. Application Data (63) Continuation-in-part of application No. 14/643,574, filed on Mar. 10, 2015, now abandoned.

(51) Int. Cl.
| | | |
|---|---|---|
| *B64C 29/00* | (2006.01) | |
| *B64C 27/24* | (2006.01) | |
| *B64C 27/20* | (2006.01) | |
| *B64C 39/00* | (2006.01) | |

(52) U.S. Cl.
CPC .......... *B64C 29/0025* (2013.01); *B64C 27/20* (2013.01); *B64C 27/24* (2013.01); *B64C 39/001* (2013.01)

(58) Field of Classification Search
CPC ..... B64C 29/0025; B64C 27/20; B64C 27/24; B64C 39/001; B64C 39/005; B64C 39/006; B64C 39/008; B64C 2201/027; B64C 2201/042; B64C 2201/108; B64C 2201/162; B64C 11/001; Y02T 50/64
See application file for complete search history.

(56) References Cited

U.S. PATENT DOCUMENTS

| | | | | |
|---|---|---|---|---|
| 1,585,281 A | * | 5/1926 | Craddock | B64C 29/0025 244/23 R |
| 2,876,965 A | * | 3/1959 | Streib | B64C 39/06 244/12.2 |
| 2,939,648 A | * | 6/1960 | Fleissner | B64C 39/001 244/12.2 |
| 2,940,691 A | * | 6/1960 | Constant, V | B64C 29/0025 244/12.3 |
| 2,953,900 A | * | 9/1960 | Price | F02C 6/20 60/262 |
| 2,997,254 A | * | 8/1961 | Mulgrave | B64C 29/0066 244/12.2 |

(Continued)

*Primary Examiner* — Medhat Badawi
(74) *Attorney, Agent, or Firm* — Chen Yoshimura LLP (57) ABSTRACT

A vertical takeoff and landing aircraft has a circular body with a cockpit at the center, and multiple vertical, horizontal, and other directional through tunnels inside the body. A propelling device such as ducted fan, jet turbine or rocket is provided inside each tunnel. Each propelling device is completely disposed within a tunnel with no exposed parts. The bottom surface of the aircraft has a circular lip forming the lowest part of the aircraft, and the portion of the bottom surface surrounded by the circular lip is concave, where the multiple vertical through tunnels open to the concave portion. A control system controls the thrust produced by each propelling device so as to precisely control the horizontal and vertical speed and the pitch, roll, and yaw angles of the aircraft. Communication and positioning equipment are provided onboard, as well as various sensors. The aircraft may be manned or unmanned.

18 Claims, 6 Drawing Sheets

(56) References Cited

U.S. PATENT DOCUMENTS

| | | | | |
|---|---|---|---|---|
| 3,080,137 A | * | 3/1963 | Hurel | B64C 29/0025 244/12.3 |
| 3,082,977 A | * | 3/1963 | Arlin | B64C 29/0025 244/17.23 |
| 3,394,906 A | * | 7/1968 | Rogers | B64C 39/001 244/23 R |
| 3,410,507 A | * | 11/1968 | Moller | B64C 29/0025 244/23 C |
| 3,442,469 A | * | 5/1969 | Davis | B64C 39/001 244/23 C |
| 3,514,053 A | * | 5/1970 | McGuinness | B64C 39/001 244/12.2 |
| 3,614,030 A | * | 10/1971 | Moller | B64C 39/001 244/23 C |
| 3,640,489 A | * | 2/1972 | Jaeger | B64C 39/001 244/23 C |
| 3,750,980 A | * | 8/1973 | Edwards | B64C 39/001 244/12.2 |
| 3,752,417 A | * | 8/1973 | Lagace | B64C 29/0025 244/12.2 |
| 3,752,419 A | * | 8/1973 | Richter | B64C 39/001 244/23 C |
| 3,912,201 A | * | 10/1975 | Bradbury | B64C 29/0016 244/23 D |
| 3,946,970 A | * | 3/1976 | Blankenship | B64C 39/001 244/23 C |
| 3,985,320 A | * | 10/1976 | Brady | B64C 17/06 244/93 |
| 4,023,751 A | * | 5/1977 | Richard | B64C 39/001 244/23 C |
| 4,071,207 A | * | 1/1978 | Piasecki | B64C 29/0025 180/118 |
| 4,086,723 A | * | 5/1978 | Strawick | A63H 27/12 446/47 |
| 4,193,568 A | * | 3/1980 | Heuvel | B64C 39/001 244/23 C |
| 4,214,720 A | * | 7/1980 | Desautel | B64C 39/001 244/12.2 |
| 4,433,819 A | * | 2/1984 | Carrington | B64C 29/0008 244/12.2 |
| 4,457,476 A | * | 7/1984 | Andresevitz | B64C 29/00 244/23 C |
| 4,757,962 A | * | 7/1988 | Grant | B64C 39/001 180/116 |
| 4,799,629 A | * | 1/1989 | Mori | B64C 27/08 244/23 C |
| 5,178,344 A | * | 1/1993 | Dlouhy | B64C 27/20 244/12.2 |
| 5,209,428 A | * | 5/1993 | Bevilaqua | B64C 29/0025 244/12.3 |
| 5,344,100 A | * | 9/1994 | Jaikaran | B64C 27/20 244/12.2 |
| 5,419,514 A | * | 5/1995 | Ducan | B64C 29/0033 244/12.4 |
| 5,765,778 A | * | 6/1998 | Otsuka | B64C 25/56 244/100 A |
| 5,895,011 A | * | 4/1999 | Gubin | B64C 29/00 244/12.1 |
| 6,050,520 A | * | 4/2000 | Kirla | B64C 29/00 244/10 |
| 6,179,247 B1 | * | 1/2001 | Milde, Jr. | B64C 29/00 244/23 A |
| 6,254,032 B1 | * | 7/2001 | Bucher | B64C 29/0033 244/12.2 |
| 6,371,406 B1 | * | 4/2002 | Corcoran | B64C 15/02 244/12.2 |
| 6,581,872 B2 | * | 6/2003 | Walmsley | B64C 27/20 244/12.2 |
| 6,672,539 B1 | * | 1/2004 | Schoeneck | B64C 27/20 244/12.2 |
| 7,149,611 B2 | * | 12/2006 | Beck | B60K 17/046 701/2 |
| 7,159,878 B1 | * | 1/2007 | McKenna | A45C 5/14 280/47.26 |
| 7,931,239 B2 | * | 4/2011 | Pedersen | B64C 39/024 244/189 |
| 8,016,226 B1 | * | 9/2011 | Wood | B64C 29/0033 244/12.4 |
| 8,960,592 B1 | * | 2/2015 | Windisch | A63H 30/04 244/12.5 |
| 9,096,314 B2 | * | 8/2015 | Brotherton-Ratcliffe | B64C 27/20 |
| 9,550,566 B2 | * | 1/2017 | Henning, Jr. | B64C 39/06 |
| 9,645,580 B2 | * | 5/2017 | Pedersen | B60V 1/06 |
| 2001/0040062 A1 | * | 11/2001 | Illingworth | B64C 11/001 180/117 |
| 2002/0047071 A1 | * | 4/2002 | Illingworth | B64C 11/001 244/199.1 |
| 2003/0062443 A1 | * | 4/2003 | Wagner | B64C 3/56 244/12.3 |
| 2011/0042510 A1 | * | 2/2011 | Bevirt | B64C 29/0033 244/12.4 |
| 2011/0101155 A1 | * | 5/2011 | Smith | B64C 39/064 244/12.1 |
| 2012/0056040 A1 | * | 3/2012 | Brotherton-Ratcliffe | B64C 27/20 244/23 A |
| 2013/0112804 A1 | * | 5/2013 | Zhu | B64C 29/0025 244/2 |
| 2013/0221158 A1 | * | 8/2013 | Binkholder | B64D 7/08 244/137.4 |
| 2013/0345923 A1 | * | 12/2013 | Neama | F02D 41/26 701/29.4 |
| 2014/0103158 A1 | * | 4/2014 | Berry | B64C 29/0025 244/2 |
| 2016/0031554 A1 | * | 2/2016 | Eshkenazy | B64C 39/024 244/6 |
| 2016/0200415 A1 | * | 7/2016 | Cooper | A63H 27/12 244/17.15 |
| 2016/0229530 A1 | * | 8/2016 | Welsh | B64C 39/024 |
| 2016/0304193 A1 | * | 10/2016 | Marcel | B64C 27/08 |
| 2016/0340035 A1 | * | 11/2016 | Duru | B64C 27/20 |

\* cited by examiner

HOVER AIRLIFT LOGISTICS OPERATIONS GUIDED EXPEDITIONARY AUTONOMOUS SCALABLE AND MODULAR VTOL PLATFORM

BACKGROUND OF THE INVENTION

Field of the Invention

The present invention relates to vertical takeoff and landing (VTOL) aerial vehicles. In particular, the application is directed towards a ducted fan VTOL vehicle having extended durability and survivability capabilities. One embodiment is a VTOL unmanned aerial vehicle (UAV).

Description of Related Art

Currently there are many aircraft that are classified in the VTOL category, these include but are not limited to: helicopters, Bell-X-14, Bell-X-22, Bell-XV-15, Dornier Aerodyne, DARPA TX, Harrier variants, Boeing-Vertol VZ-2, Boeing X-32, Canadair CL-84, CarterCopter, Convair XFY-1, Curtiss-Wright X-19, Dassault Balzac V, Hawker Siddeley Kestrel, Lockheed XFV-1 "Salmon", Lockheed XV-4 Hummingbird, Lockheed Martin F-35 Lightning II, and the Ryan XV-5 Vertifan.

These mentioned aircraft, and many more, applied a variety of methods to attain their vertical lift function. These methods are; diverted jet thrust, tilt wing, tilt rotor, rotary wing, fan in wing, direct jet thrust and ducted fan thrust. Several patents that cover these principles include: U.S. Pat. Nos. 3,912,201, 5,209,428, 3,080,137, and 2,940,691.

The most successful of these VTOL categories is the rotary wing, more commonly known as the helicopter. Although it has reached utilitarian status, the helicopter has multiple limitations, these include; a limited horizontal speed envelope, rotor strike safety concerns and multiple complex mechanical features.

SUMMARY OF THE INVENTION

Although not as efficient as the large exposed rotor blades of the helicopter, the ducted fan (shrouded propeller) offers several advantages, these include: (when mounted in an aerodynamic wing like structure) a large speed envelope, minimal blade strike safety issues, simple mechanical coupling, inherent stability, multiple design options and transitional flight capabilities. It is the principal object of this invention to provide an aircraft (manned or unmanned) with VTOL capabilities, as well as meet performance and safety criteria, without limiting platform flexibility.

In the preferred embodiment the aerial vehicle/flying platform has the take-off and landing characteristics of VTOL with safer operating characteristics than a helicopter.

An object of this invention is to provide a scalable low altitude modular VTOL aircraft platform that is inherently stable, capable of transitional and low speed horizontal flight, safe for ground personnel, easily directed/piloted, and impact resistant with deployable parachute in one embodiment. In its preferred embodiment the aircraft employs multiple ducted fans uniformly mounted in a circular body structure. The ducted fans are mounted perpendicular to the horizontal axis to maximize hovering capability. The aircraft utilizes only the ducted-fans for lift throughout its entire flight envelope.

In yet another embodiment of this invention, the aircraft employs multiple ducted fans uniformly mounted in a circular body structure, with one or more of the ducted fans permanently mounted or actuated to an angle between 90 and 0 degrees to produce more horizontal thrust to increase the range of the vehicle.

The aircraft includes at least one power source, and separate control for each ducted fan, to generate and transfer adequate power and torque to develop the thrust required to lift and maneuver the aircraft through its entire flight. This invention while not unique in its flight envelope VTOL, differs substantially from previous prior art, in its overall platform (multiple independently variable thrust ducted fans), transitional flight capability as well as its flexible operator control options (remote-controlled, autonomous, piloted, or any variation thereof), damage-resistant structure and increased aerodynamic stability.

One embodiment of the invention provides a vertical take-off and landing aircraft, which includes: a body having a circular shape extending horizontally to a circular outer edge, the body defining a top surface and a bottom surface, the bottom surface including a circular lip which is located at a lowest position of the aircraft, the bottom surface further including a concave portion surrounded by the circular lip; a cockpit disposed in a center region of the body; a first plurality of through tunnels defined inside the body and arranged around the center region of the body, each of the first plurality of tunnels extending substantially vertically through the body between the top surface and the concave portion of the bottom surface; a second plurality of through tunnels defined inside the body, each of the second plurality of tunnels extending substantially parallel to a horizontal front-back direction of the body between a front end and a rear end of the body; a third plurality of through tunnels defined inside the body, each of the third plurality of tunnels extending in a direction which is neither substantially vertical nor substantially parallel to the horizontal front-back direction of the body, each of the third plurality of tunnels having an upper opening located on the top surface of the body and a side opening; a plurality of propelling devices, each propelling device being completely contained within one of the first, second and third plurality of tunnels, each propelling device being fixedly mounted to the body to generate propulsion in a fixed direction relative to the aircraft; and control equipment disposed inside the body and coupled to the plurality of propelling devices, configured to control the plurality of propelling devices.

In some embodiments, the third plurality of through tunnels includes two side tunnels, located in a front half of the body on opposite sides of a longitudinal vertical center plane of the body, each side tunnel extending from its upper opening downwardly and sideways away from the longitudinal vertical center plane to its side opening, the side opening being located at the outer edge of the body. In some embodiments, the third plurality of through tunnels further includes at least two tail tunnels, located in a rear half of the body on opposite sides of the longitudinal vertical center plane, each tail tunnel extending from its upper opening downwardly, rearwardly, and sideways away from the longitudinal vertical center plane to its side opening, the side opening being located at the outer edge of the body.

In some embodiments, the aircraft further includes: a first plurality of auxiliary through tunnels extending substantially vertically through the body, the first plurality of auxiliary through tunnels being smaller than the first plurality of through tunnels; a second plurality of auxiliary through tunnels extending substantially parallel to the horizontal front-back direction through the body, the second plurality of auxiliary through tunnels being smaller than the second plurality of through tunnels; and a plurality of auxiliary propelling devices, each auxiliary propelling device being completely contained within one of the first and second plurality of auxiliary tunnels, each auxiliary propelling device being fixedly mounted to the body to generate propulsion in a fixed direction relative to the aircraft.

In some embodiments, the body has hollow interior spaces. The body further includes internal partitions which divide the hollow interior spaces into multiple hollow compartments, wherein at least some of the hollow compartments are sealed to outside atmosphere, and at least some of the hollow compartments are accessible from outside of the body.

The vertical take-off and landing aircraft further includes: communication equipment and positioning equipment disposed inside the body; a power source system; and sensors located on an exterior of the body; wherein the communication equipment, the positioning equipment, the power source system, and the sensors are connected to the control equipment.

In another aspect, the present invention provides vertical take-off and landing flying platform, which includes: a body having a circular shape extending horizontally, defining a top surface and a bottom surface, the bottom surface of the body having a concave arched shape surrounded by a circular lip which is located at a lowest position of the flying platform; a payload container disposed in a center region of the body; a plurality of hollow spaces defined inside the body and arranged in a circular arrangement around the center region of the body, each hollow space extending substantially vertically through the body from the top surface to the concave bottom surface; and a plurality of ducted fans, each ducted fan being completely contained within one of the hollow spaces, each ducted fan being fixedly mounted to the body to rotate around a fixed rotational axis.

DETAILED DESCRIPTION OF THE INVENTION

FIGS. 1 through 5 depict an aircraft (also referred to as an aerial vehicle, or a flying platform) according to a first embodiment of the invention that utilizes multiple ducted fans for vertical lift (FIG. 1-5, showing ducted fan assemblies with shrouds 1 and 4 and similar ducted fans to the right or left of fans 1 and 4). A modular, removable payload space and cockpit 2 is provided in a center region of the aircraft. The aircraft has an outer diameter defined by an annular ring 3. The annular rings may be formed of impact resistant materials to allow the craft to maintain flight even when impacted in cluttered environments.

Figure 1:
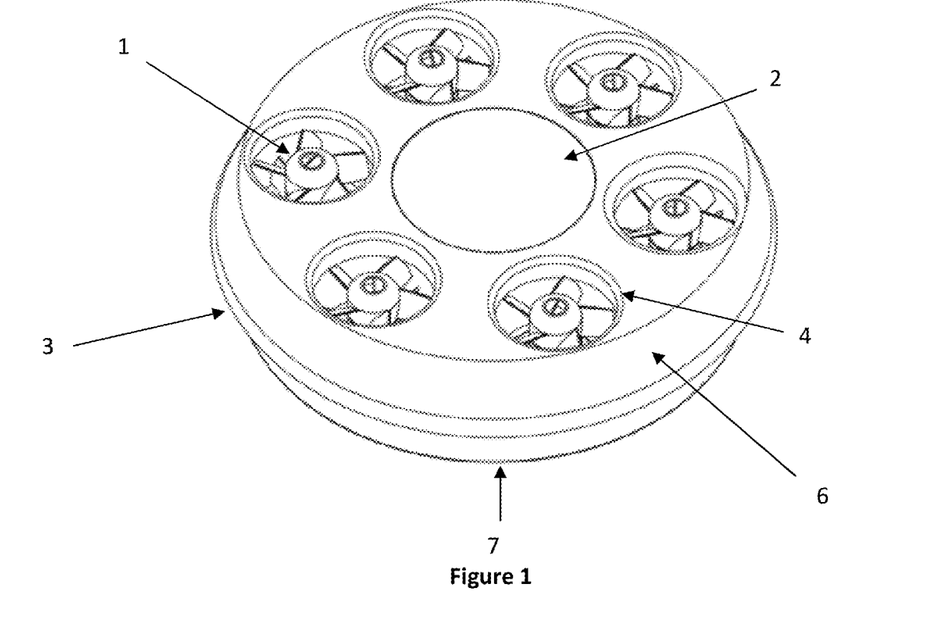
FIG. 1 is a schematic top perspective view of a vertical takeoff and landing aircraft according to a first embodiment of the present invention.
Figure 2:
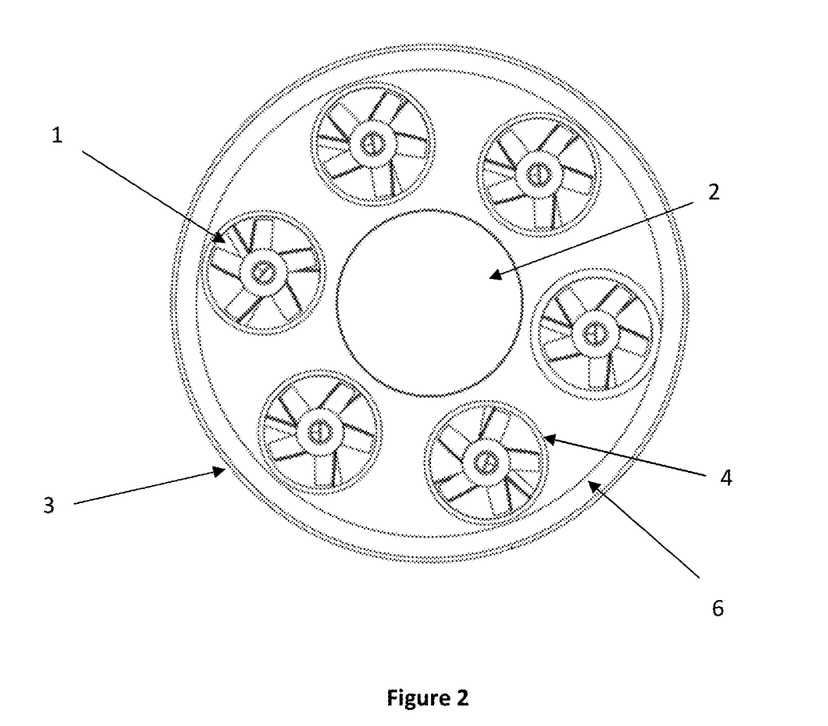
FIG. 2 is a top view of the aircraft of FIG. 1.
Figure 3:
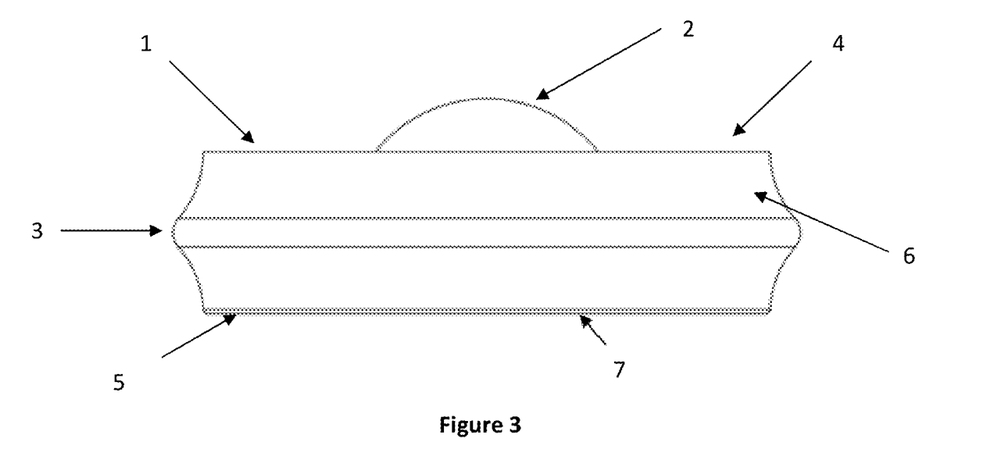
FIG. 3 is a side view of the aircraft of FIG. 1.
Figure 4:
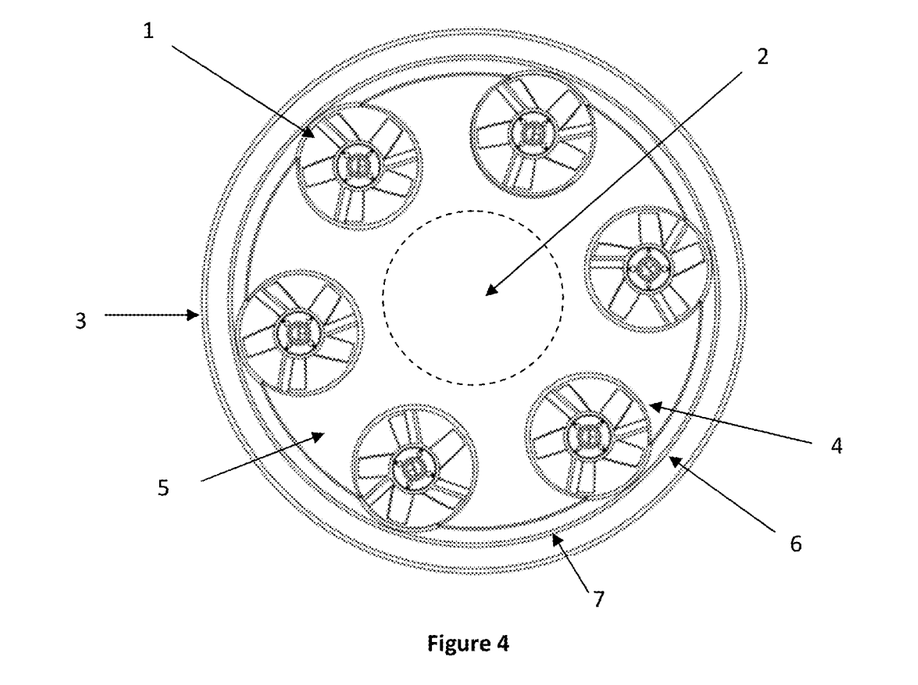
FIG. 4 is a bottom view of the aircraft of FIG. 1.
Figure 5:
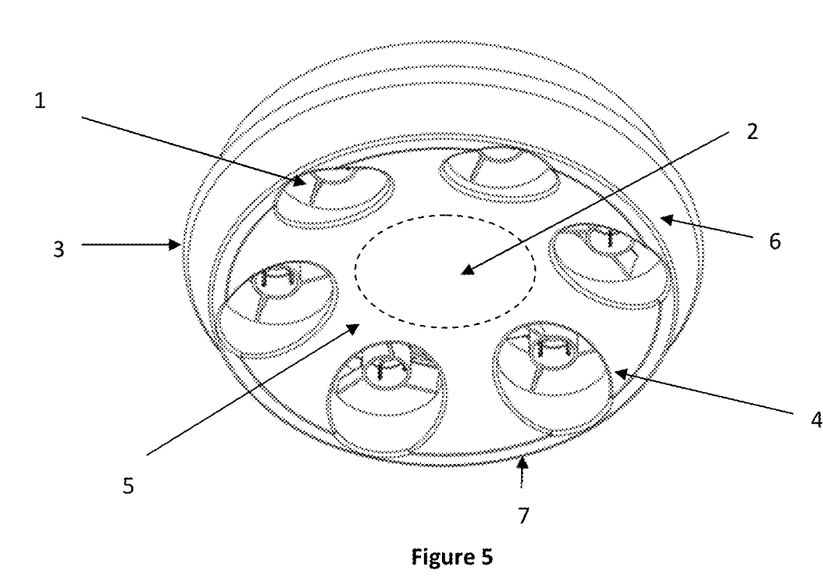
FIG. 5 is a bottom perspective view of the aircraft of FIG. 1.

The bottom of the aircraft has a bottom curved arch 5 incorporating the removable payload space and cockpit in detail 2, towards its center. The arched bottom shape below the craft provides aerodynamic stability. In one embodiment, the body structure has hollow interior spaces which runs the entire circumference between the concentric inner diameter (e.g. defined by the cockpit space 2) and outer diameter (e.g. the outer side wall) of the body structure. The hollow space serves to reduce weight and is also capable of accommodating multiple sensors or payload within them. FIG. 5 shows a circumference of the bottom surface of the craft which forms a circular lip 7 which, in one embodiment, can be lined with materials which allows vertical takeoff and landing from water or swamp areas.

This embodiment as described in FIG. 1 through 5 depicts an aircraft that utilizes multiple ducted fans for vertical take-off and landings. The vehicle's 3 axis (roll, pitch and yaw) movements, vertical and horizontal flight, vertical take-offs and landings are accomplished by coordinated differential ducted-fan thrust. Thus, to maintain 3-axis control while in vertical flight mode, the thrust from each ducted fan is selectively varied. Maximum hover low-speed horizontal flight mode is supported when the multiple ducted fans are mounted with their rotational axes perpendicular to the horizontal plane. Higher-speed horizontal flight is supported when one or more of the ducted fans is either permanently mounted or actuated such that it rotational axis is at an angle between 90 and 0 degrees to the horizontal plane.

The aircraft includes an on-board flight and navigation computer system that operates the aircraft's flight, navigation and autonomous functions. Logistic control and the functional flight operation of this depicted aircraft is maintained through, but not limited to, a remotely piloted control system. Its navigational and stability system include autonomous and remotely actuated features, including (but not limited to): GPS navigation systems, computer-assisted gyroscope, barometric, ultra-sound ranging, and thermal-sensing features. The control system as well as the navigational and stability systems may be located inside the body structure or in the payload space or cockpit 2. The removable payload space or cockpit 2 allows the insertion/removal of modular mission or application programmable/oriented electromechanical interfaces.

The aircraft also includes a power source, located inside the body structure or in the payload space or cockpit 2. The power source may include battery/hybrid power and auxiliary power sources, energy harvesting including solar panels, vibration, etc.

This embodiment as depicted includes a payload or cargo hold that may contain, but is not limited to, any combination of instruments, sensors, weapons and or cargo.

The aircraft may also be provided with a deployable parachute for safety of the aircraft and its cargo.

Figure 6:
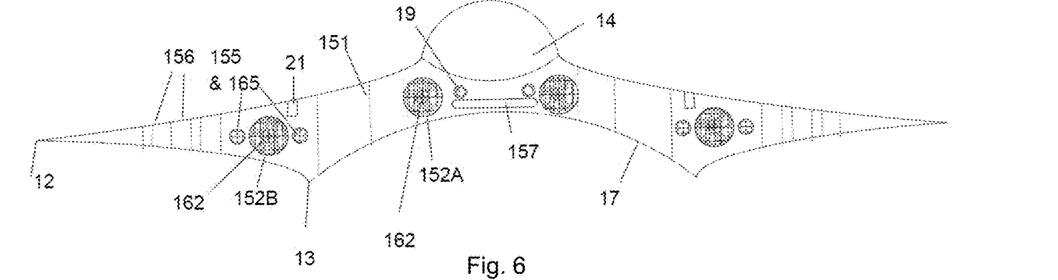
FIG. 6 is a schematic side cross-sectional view of a vertical takeoff and landing aircraft according to a second embodiment of the present invention.
Figure 7:
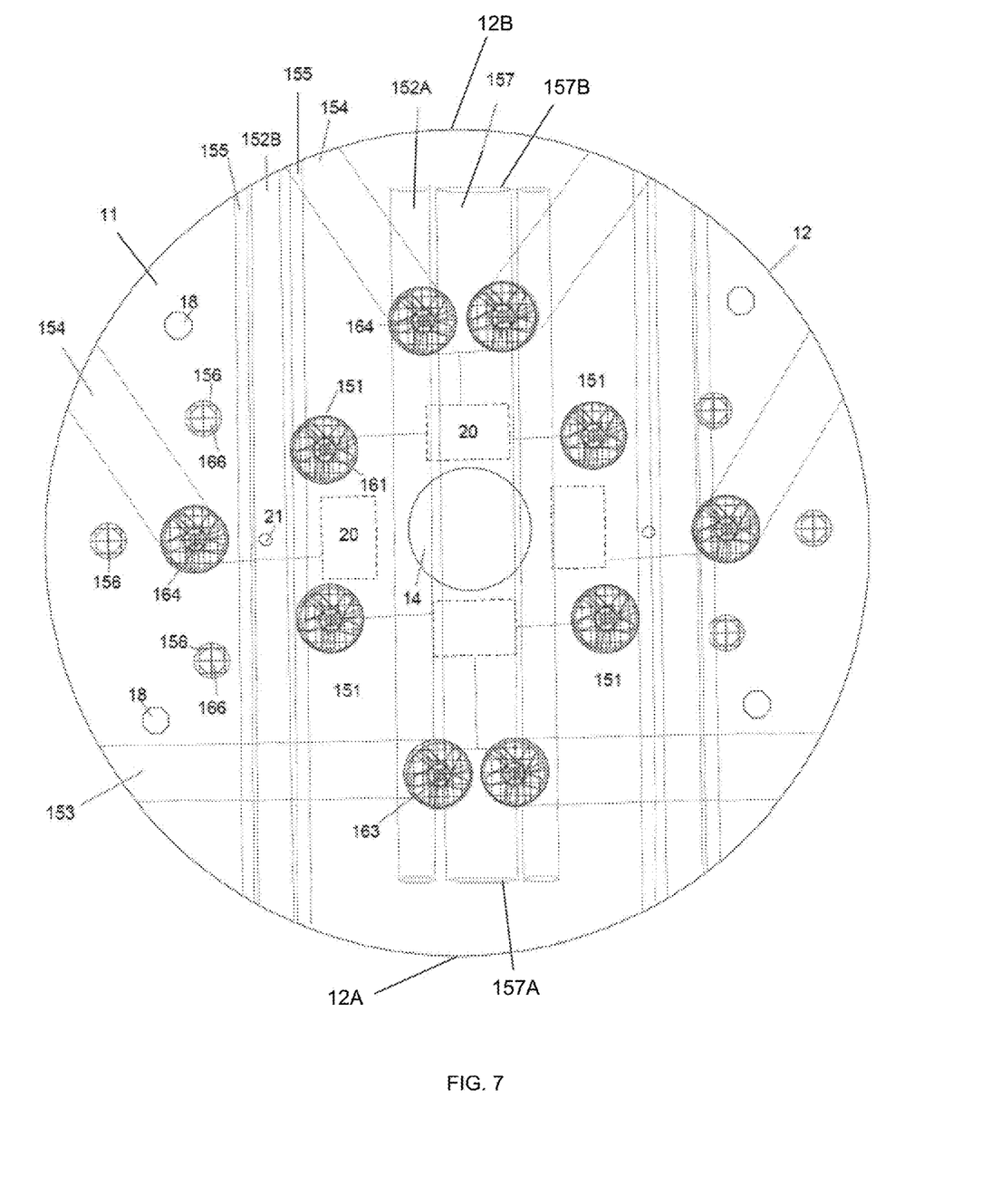
FIG. 7 is a schematic top cross-sectional view of the aircraft of FIG. 6.
Figure 8:
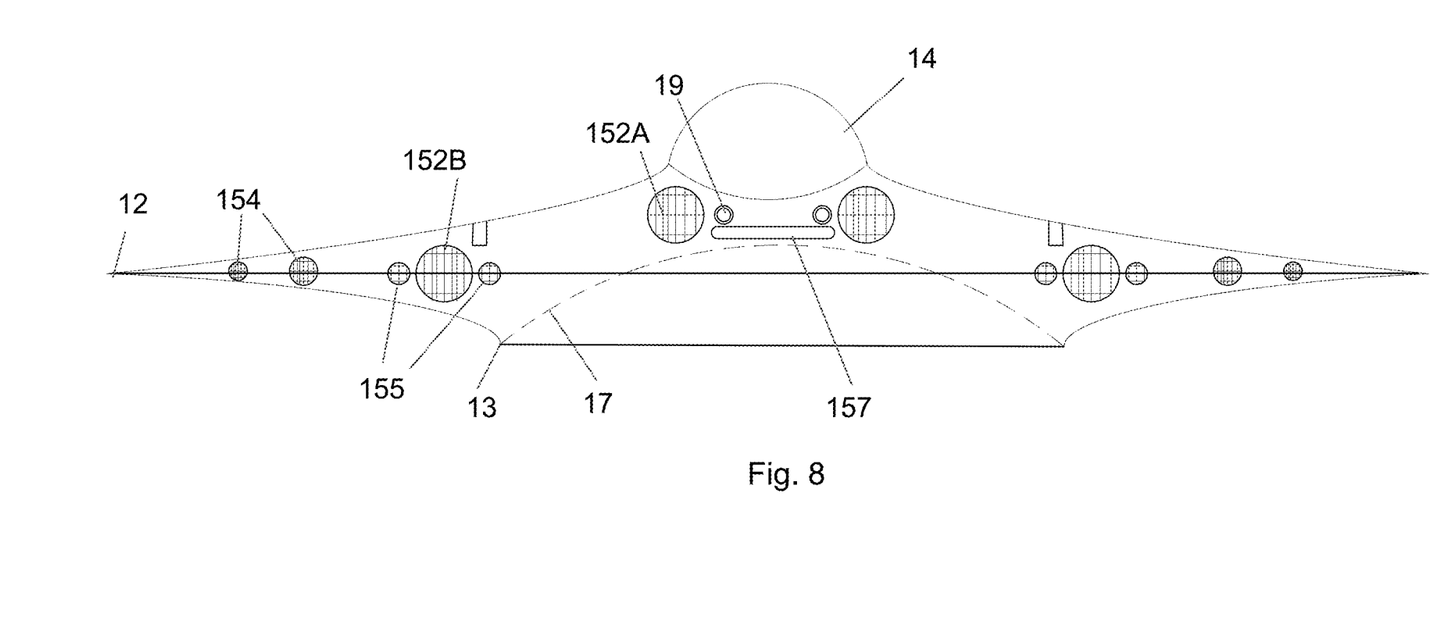
FIG. 8 is a back side view of the aircraft of FIG. 6.

FIGS. 6-8 schematically illustrate an aircraft according to a second embodiment of the present invention. As shown in FIG. 7 (top view), the aircraft 10 has a body 11 that has a round shape in the top view. Preferably, the shape of the body is rotationally symmetrical around a vertical central axis. In the view of FIG. 7, the bottom is the front end of the aircraft and the top is the back end of the aircraft; the aircraft generally flies in a "front forward" direction but is not limited to such a flight direction. FIG. 6 is a schematic side cross-sectional view in a vertical plane that passes through the central axis of the body (as indicated by the arrows A-A' in FIG. 7). In the embodiment illustrated in FIGS. 6 and 8, the body 11 extends outwardly to a relatively sharp circular edge 12, forming a circular wing. In alternative embodiments, the outermost edge 12 of the body 11 may have a rounded shape in the side cross-sectional view. The side of the body above the edge 12 of the wing, referred to as the upper side or top side, generally curves downwardly toward the edge. The side of the body below the edge 12 of the wing, referred to as the lower side or bottom side, has a circular lip 13 which will be described in more detail later. The cockpit 14 of the aircraft is located on the top side of the body at the center. In one embodiment, pressurized cabin and radiation protection are provided for the cockpit, allowing transition and ascent into space and sub-orbital/orbital environments of planets.

Similar to the first embodiment, the aircraft 10 of the second embodiment has a body with a plurality of through tunnels 15 (including 151-156) formed within the body. Individual ducted fans, jet turbines or rockets (more generally, propelling devices) 16 (including 161-166) are disposed inside the tunnels 15 to eject air or gas out of the tunnels to provide propulsion. All propelling devices 16 are fixedly mounted in the respective tunnels 15. For example, each ducted fan is fixedly mounted to the body to rotate around a fixed rotational axis. The tunnels are fixedly (non-moveably) located inside the body. Thus, the direction of propulsion provided by each propelling device 16 is fixed relative to the aircraft body 11, and the direction and speed of flight and other maneuvers of the aircraft are controlled by the amount of propulsion provided by each propelling device.

Note that the tunnels are arranged in a left-right symmetrical manner, and only tunnels on one side of the body are labeled in FIGS. 6-8.

As shown in FIGS. 6-8, the through tunnels include a first set of tunnels 151 that extend substantially vertically (forming an angle less than 10 degrees with respect to the vertical direction), a second set of tunnels 152A-152B that extend substantially horizontally in the front-back direction (forming an angle less than 10 degrees with respect to the horizontal plane and an angle less than 10 degrees with respect to the front-back direction), and a third set of tunnels 153-154 extending in directions that are neither substantially vertical nor substantially parallel to the front-back horizontal direction.

More specifically, in the illustrated embodiment, the first set of vertical tunnels 151 are distributed along a circle around the central axis of the body, although other locations are also possible. A ducted fan 161 is provided inside each of the first set of tunnels 151. These fans 161 provide vertical lift for the aircraft. The second set 152 includes four horizontal tunnels extending parallel to each other in the front-back (longitudinal) direction, two of which 152A being closer to the central axis and the other two 152B being farther away. As shown in FIG. 6 and FIG. 8, the two farther-away horizontal tunnels 152B are located at a vertical height that is approximately aligned with the height of the widest part 12 of the body, i.e., the openings of the tunnels are located approximately at the same height of the outer edge 12 of the body. The closer horizontal tunnels 152A are located higher than the height of the widest part 12 of the body. A ducted fan 162 is provided inside each of the second set of tunnels 152. These fans 162 provide a horizontal longitudinal thrust for the aircraft 10, which can be in either the forward or the backward direction.

In the illustrated embodiment, the third set of tunnels include two side tunnels 153 located in the front half of the aircraft. Each side tunnel 153 has an upper opening located on the top surface of the body near the longitudinal vertical center plane of the body, and extends sideways away from that plane as well as downwardly, to a side opening located approximately at the same height as the outer edge 12 of the body. A ducted fan 163 is provided inside each of the side tunnels. These fans provide a sideways (lateral) thrust for the aircraft for changing its flight direction. The third set of tunnels further include four tail tunnels 154, preferably located in the rear half of the aircraft. Each tail tunnel 154 has an upper opening located on the top surface of the body, and extends from that opening in a direction that is rearwardly, sideways away from the longitudinal vertical center plane, and downwardly, to an opening located approximately at the same height as the outer edge 12 of the body (see FIG. 8). Preferably, the direction of the tail tunnels 154 in the top view is approximately 45 degrees (e.g. 40-50 degrees) with respect to the longitudinal direction. The side tunnels 153 and the tail tunnels 154 may have bent shapes rather than a straight-line shape. For example, each tunnel may make one more bends of obtuse angles. A ducted fan 164 is provided inside each of the tail tunnels 154. These fans provide thrusts for the aircraft for various maneuvers such as in the pitch, roll, and yaw angles.

Optionally, a number of smaller auxiliary tunnels 155-156 are provided for additional propulsion, maneuverability, or stability. In the illustrated embodiment, two horizontal auxiliary tunnels 155 are provided next to and parallel to each of the outer horizontal tunnels 152B. A rocket or jet turbine 165 is provided inside each of the horizontal auxiliary tunnels 155. A number of (e.g., six) vertical auxiliary tunnels 156 are also provided, with a rocket or jet turbine 166 provided inside each of them.

In addition, a passthrough tunnel 157, having a horizontally elongated cross-sectional shape and extending horizontally from front to back, is provided at the center of the aircraft, below the cockpit 14. The passthrough tunnel is located above the height of the circular edge 12 (see FIG. 8), and extends from an inlet 157A adjacent to a leading edge 12A of the circular edge to an outlet 157B adjacent a trailing edge 12B of the circular edge without other openings (see FIG. 7). This tunnel is free of any propelling devices, and is provided as a passthrough to enhance aerodynamic stability.

All of the tunnels, including the first 151, second 152 and third sets 153-154 of tunnels, the auxiliary tunnels 155 and 156 and the passthrough tunnel 157, are arranged inside the volume of the body in such a way that they do not intersect one another. For example, the side tunnels 153 and the tail tunnels 154 may have a bent shape to avoid intersecting the horizontal tunnels 152A and 152B.

All propelling devices 16 are completely disposed inside the corresponding tunnels 15 with no parts exposed outside of the outer surface of the body 11. A protective mesh may be provided at one or both ends of each tunnel to prevent large foreign objects from entering the tunnels.

The aircraft 10 does not have any wheels, or any support structure other than the body 11 itself. As seen in the side cross-sectional view of FIGS. 6 and 8, the lowest part of the body is a circular lip 13 on the bottom side. When the aircraft 10 rests on relatively flat ground, the circular lip 13 will be the only part of the aircraft that contacts the ground. While in the illustrated embodiment the circular lip 13 has a relatively sharp bottom edge, in alternative embodiments, the bottom of the lip may be wider and/or more rounded. The lip 13 may be formed of, or coated with, a wear resistant and water tight material, such as a composite material.

The inner portion 17 of the bottom side of the aircraft located inside the radius of the circular lip 13 has a concave shape, i.e. it curves upwards from the circular lip. The lower openings of the first set of vertical tunnels 151 are located in this portion of the bottom side. During vertical takeoff, the concave portion 17 forms an air pocket that facilitates a smooths takeoff.

The body 11 of the aircraft preferably has hollow interior spaces. In some embodiments, the volume of the body not taken up by the various tunnels 151-157 are substantially hollow. In such a structure, the body is a shell, and the tunnels are tubes that extend across the otherwise hollow interior space of the body. Struts may be optionally provided to support various parts of the shell. Internal partitions may be formed to divide the hollow interior space into multiple compartments. Some of the hollow compartments are sealed to the outside atmosphere, while others are accessible from the outside and can be used as storage and cargo compartment to store equipment, fuel, payload, etc. The hollow interior spaces reduce the weight of the aircraft and allows it to float on water.

A bottom portion of the aircraft body is preferably coated with a material that makes it water tight. This allows the aircraft to securely float on water and to achieve vertical takeoff and landing from water or swamp areas. The coated parts may cover the entire concave portion 17, the portion between the circular edge 12 and the circular lip 13, and may also cover a portion of the surface above the circular edge 12.

When floating on water, a lower portion of the body is submerged in water. Preferably, the shape of the body and the weight of the aircraft are designed such that the waterline is below the bottom opening of the vertical tunnels 151. In other words, the bottom opening of the vertical tunnels 151 are preferably above the water surface. Thus, when floating on water, the upper part of the concave portion 17 of the bottom surface still forms an air pocket to facilitate vertical takeoff on water.

The body 11 of the aircraft may be made of rigid materials, preferably aerospace grade materials, or made of flexible materials, thus forming an inflatable and deflatable body. The body 11 may alternatively be made partly of rigid materials and partly of flexible materials such that the body is partly inflatable/deflatable. For example, an upper portion of the body may be rigid while a lower portion of the body may be made inflatable/deflatable; or a lower portion of the body may be rigid while an upper portion of the body may be made inflatable/deflatable. When it is inflatable or partly inflatable, the inflatable portion of body may be filled with helium or other gas. In FIG. 7, a plurality of air inlet/outlets 18 are shown, which are used to inflate and deflate different mutually isolated air-tight sections of the inflatable/deflatable body.

The entire surface of the aircraft is preferably coated with a corrosion resistant and refractory (high temperature resistant) material. Anti-radar stealth coating may also be applied to the body.

Any suitable technologies may be used to implement the propelling devices 16 including the ducted fans, jet turbines and rockets, many of which are known. The ducted fans 161-164 provided in the first, second and third sets of tunnels 151-154 may be replaced with rockets for use in outer space where an atmosphere is not present or insufficient, such as on the moon or another planet.

The aircraft may utilize any suitable power source, such as liquid fuel, solid fuel, electrical power (batteries), nuclear power such as a low energy nuclear reaction (LENR) module, etc., or combinations thereof. The power system may include a 3-phase AC generator to power the ducted fans.

As mentioned earlier, the aircraft may be a manned or unmanned aircraft. The aircraft is controlled by a control system, which controls the thrust produced by each propelling device. The horizontal and vertical speed, the maneuver in the pitch, roll, and yaw angles, etc. of the aircraft are controlled by precisely controlling the thrust of each propelling device. The control system employs suitable electrical circuits, controllers, processors with memories storing computer-executable programs, etc. The aircraft also includes suitable communication equipment, such as equipment for cellular, satellite, or other forms of wireless communication, positioning equipment such as GPS (global positioning system) devices, and other suitable equipment. The aircraft is also provided with headlights and various sensors such as video cameras, radars, etc. for collision avoidance and other purposes. Such lights and sensors are located at suitable locations on the outside of the body. Two sensors 19 are shown as examples in FIGS. 6 and 8 (note that FIG. 6 is a side cross-sectional view; the sensors 19 are located at the front of the aircraft and not on the cross-section, but they are schematically illustrated in this cross-sectional view to indicate their relative location).

As mentioned earlier, the power system, the control system, and other equipment or payload are stored inside compartments in the body 11. In FIG. 7, dashed line boxes 20 schematically illustrate these equipment, and they are schematically shown as being coupled to the various propelling devices 16.

One or more parachutes are optionally provided for the aircraft 10. In the illustrated embodiment, two parachutes are provided, and their deployment and attachment locations are shown in FIG. 6 and FIG. 7 at locations 21. Alternatively, three or more parachutes may be provided, and their attachment locations are chosen to maintain the balance and stability of the aircraft after the parachutes are deployed.

The aircraft according to embodiments of this invention may be suitably sized to be used as toy or unmanned aerial system or be suitably sized to be used as conventional human transportation. It is useful as an unmanned VTOL platform, supporting an unlimited variety of hazardous or redundant utilitarian air-vehicle responsibilities and functions.

What is claimed is:

1. A vertical take-off and landing aircraft, comprising:
    a body having a circular shape extending horizontally to a circular outer edge, the body defining a top surface and a bottom surface, the bottom surface including a circular lip which is located at a lowest position of the aircraft, the bottom surface further including a concave portion surrounded by the circular lip;
    a cockpit disposed in a center region of the body;
    a first plurality of through tunnels defined inside the body and arranged around the center region of the body, each of the first plurality of tunnels extending substantially vertically through the body between the top surface and the concave portion of the bottom surface;
    a second plurality of through tunnels defined inside the body, each of the second plurality of tunnels extending substantially parallel to a horizontal front-back direction of the body between a front end and a rear end of the body;
    a third plurality of through tunnels defined inside the body, each of the third plurality of tunnels extending in a direction which is neither substantially vertical nor substantially parallel to the horizontal front-back direction of the body, each of the third plurality of tunnels having an upper opening located on the top surface of the body and a side opening;

a plurality of propelling devices, wherein each propelling device is completely contained within one of the first, second and third plurality of tunnels, and wherein each propelling device is fixedly mounted to the body to generate propulsion in a fixed direction relative to the aircraft;

a passthrough tunnel defined inside the body and located below the cockpit, having a horizontally elongated cross-sectional shape and extending horizontally in the front-back direction of the body from an inlet adjacent to a leading edge of the circular outer edge of the body to an outlet adjacent a trailing edge of the circular outer edge of the body without other openings, wherein the passthrough tunnel is free of any propelling devices; and control equipment disposed inside the body and coupled to the plurality of propelling devices, configured to control the plurality of propelling devices.

2. The vertical take-off and landing aircraft of claim 1, wherein the second plurality of through tunnels includes two tunnels each having a front opening and a rear opening located at the outer edge of the body.

3. The vertical take-off and landing aircraft of claim 2, wherein the second plurality of through tunnels further includes two tunnels located at a height above that of the outer edge.

4. The vertical take-off and landing aircraft of claim 1, wherein the third plurality of through tunnels includes two side tunnels, located in a front half of the body on opposite sides of a longitudinal vertical center plane of the body, each side tunnel extending from an upper opening of the side tunnel downwardly and sideways away from the longitudinal vertical center plane to a side opening of the side tunnel, wherein the side opening is located at the outer edge of the body.

5. The vertical take-off and landing aircraft of claim 4, wherein the third plurality of through tunnels further includes at least two tail tunnels, located in a rear half of the body on opposite sides of the longitudinal vertical center plane, each tail tunnel extending from an upper opening of the tail tunnel downwardly, rearwardly, and sideways away from the longitudinal vertical center plane to a side opening of the tail tunnel, wherein the side opening is located at the outer edge of the body.

6. The vertical take-off and landing aircraft of claim 5, wherein each of the two tail tunnels extends in a direction approximately 45 degrees with respect to the front-back direction in a top view.

7. The vertical take-off and landing aircraft of claim 5, wherein each of the side tunnels and the tail tunnels has a bent shape that includes one or more bends of obtuse angles.

8. The vertical take-off and landing aircraft of claim 1, further comprising:

a first plurality of auxiliary through tunnels extending substantially vertically through the body, wherein the first plurality of auxiliary through tunnels are smaller than the first plurality of through tunnels;

a second plurality of auxiliary through tunnels extending substantially parallel to the horizontal front-back direction through the body, wherein the second plurality of auxiliary through tunnels are smaller than the second plurality of through tunnels; and a plurality of auxiliary propelling devices, wherein each auxiliary propelling device is completely contained within one of the first and second plurality of auxiliary tunnels, and wherein each auxiliary propelling device is fixedly mounted to the body to generate propulsion in a fixed direction relative to the aircraft.

9. The vertical take-off and landing aircraft of claim 1, wherein the plurality of propelling devices includes a plurality of ducted fans, wherein each ducted fan is fixedly mounted to the body inside a tunnel and configured to rotate around a fixed rotational axis.

10. The vertical take-off and landing aircraft of claim 1, wherein the plurality of propelling devices includes a plurality of jet turbines or rockets.

11. The vertical take-off and landing aircraft of claim 1, wherein the control equipment is configured to control thrust generated by each of the plurality of propelling devices to control horizontal and vertical speed and pitch, roll, and yaw angles of the aircraft.

12. The vertical take-off and landing aircraft of claim 1, further comprising a plurality of protective meshes, wherein each protective mesh is disposed at an opening of one of the through tunnels.

13. The vertical take-off and landing aircraft of claim 1, wherein the body has hollow interior spaces.

14. The vertical take-off and landing aircraft of claim 13, wherein the body further includes internal partitions which divide the hollow interior spaces into multiple hollow compartments, wherein at least some of the hollow compartments are sealed to outside atmosphere, and at least some of the hollow compartments are accessible from outside of the body.

15. The vertical take-off and landing aircraft of claim 1, wherein the bottom surface of the body is coated with a water tight sealing material that makes the bottom surface water tight, and wherein the body is coated with a corrosion resistant and refractory material.

16. The vertical take-off and landing aircraft of claim 1, wherein the body is coated with an anti-radar stealth coating.

17. The vertical take-off and landing aircraft of claim 1, further comprising:

communication equipment and positioning equipment disposed inside the body;

a power source system; and sensors located on an exterior of the body;

wherein the communication equipment, the positioning equipment, the power source system, and the sensors are connected to the control equipment.

18. The vertical take-off and landing aircraft of claim 1, wherein at least a part of the body is inflatable and deflatable.

* * * * *